United States Patent Office 3,329,666
Patented July 4, 1967

3,329,666
PROCESS FOR POLYMERIZING ISOPRENE WITH A CATALYST COMPRISING LITHIUM OR AN ORGANOLITHIUM AND A HYDRATE OR CARBONYL OF A LITHIUM DERIVATIVE OF A METAL HALIDE
Richard S. Stearns, Malvern, Pa., assignor to The Firestone Tire & Rubber Company, Akron, Ohio, a corporation of Ohio
No Drawing. Filed Oct. 28, 1963, Ser. No. 319,509
9 Claims. (Cl. 260—94.2)

This application is a continuation-in-part of the applicants' earlier application, Ser. No. 603,186 filed Aug. 9, 1956 and now abandoned which in turn is a continuation-in-part of the applicant's still earlier application, Ser. No. 544,823 filed Nov. 3, 1955 and now abandoned.

This invention relates to the polymerization of conjugated diolefines and mixtures thereof with unsaturated compounds copolymerizable therewith to yield products in which the portions of the polymeric chains derived from the diolefines closely approximate the microstructure of Hevea rubber. Particularly when the diolefines are used in major proportions, and still more particularly when the diolefine employed is isoprene, the products closely approach, in technical properties and fundamental chemical and physical properties, natural Hevea rubber.

For many important uses, natural Hevea rubber is still the most satisfactory material, notwithstanding the extensive development of synthetic diene rubbers in recent years. Hevea rubber lends itself readily to fabrication processes, having excellent tack and other manipulative properties which facilitate manufacturing operations carried out thereon. Hevea rubber yields vulcanizates which are greatly superior to other diene rubber vulcanizates in point of tensile strength (particularly when the comparison is made with non-reinforced stocks), elongation at break, and low running temperature. These last properties have rendered Hevea rubber indispensable in large heavy duty tires such as truck and bus tires.

These superiorities of Hevea rubber over the synthetic diene polymers heretofore produced appears fundamentally to be due to the extreme regularity of the mode of polymerization of the isoprene residues in Hevea rubber, these residues being almost exclusively in the cis-1,4-addition configuration, i.e., in units having the structural formula

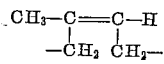

disposed along the polymer chain. Conventional synthetic diene polymers contain the diene residues in a variety of other configurations, the cis-1,4-addition mode usually constituting less than one-third of the entire structure.

It has been discovered, in an investigation in which the present applicant has been associated, that carefully purified isoprene, when polymerized by the action of metallic lithium, or other lithium-dependent catalyst, yields polyisoprene having, in a large measure, the fundamental cis - 1,4 - addition structure of Hevea rubber. In general, these polymers will contain from 70% to 90% or more of the cis-1,4-addition structure. This structural similarity is reflected in a close approach of the properties of these synthetic isoprenes to the properties of Hevea rubber. They are characterized by the excellent tack and building properties of Hevea rubber; and vulcanizates produced therefrom have tensile strength (even in non-reinforced stocks), elongation at break, and cool-running properties very nearly equalling those of Hevea rubber vulcanizates. However, these synthetic polyisoprenes fall slightly short of the properties of Hevea natural rubber, apparently because they still contain several percent of structures other than those resulting from cis-1,4-addition. It would therefore be highly advantageous to reduce this residual undesirable structure.

Accordingly, it is an object of this invention to provide a novel and advantageous method for the polymerization of conjugated diolefines.

Another object is to provide such a process which will result in the production of polymers having superior physical and chemical properties.

A further object is to provide such a process which will produce polymers having fundamental chemical structure and technical properties more closely approaching those of Hevea rubber than has heretofore been possible.

A still further object is to reduce the residual undesirable structure in the lithium catalyzed polymers above referred to.

Still another and very specific object is to produce a synthetic polymer of isoprene having fundamental structure and properties closely approaching those of Hevea rubber.

SYNOPSIS OF THE INVENTION

The present invention is based on the discovery that particularly favorable results are obtained by polymerizing conjugated diolefines, or mixtures thereof with other unsaturated compounds copolymerizable therewith, in contact with a composite catalyst comprising (A) lithium metal or a lithium compound in which the lithium exerts a strong reducing action (hereinafter designated a lithium-based component), in close association with (B) a substance having a high surface area such as to exert a directive and marshalling influence on the monomeric diolefines during polymerization. Particularly good results are secured when the substance (B) is a salt of a complex anion containing boron, silicon, arsenic or one of the heavy metals. Other factors being equal, the resultant polymer approaches more closely to the ideal Hevea-rubber-type properties and chemical structure than has been possible with other catalysts. Particularly when the diolefine used is isoprene, and when the catalyst employed is an intimate mixture of (A) a lithium-based component with (B) a chloroaluminate or chlorotitanate complex salt, the polyisoprene produced is very similar to Hevea rubber. As compared to polymers hitherto produced by lithium-based catalysis, and a fortiori as compared to polymers produced by the generality of conventional catalysts, the polymers produced in accordance with this invention approach more closely to Hevea rubber in the following particulars:

(1) They are the first polymers simultaneously free of trans-addition structures and having less than 5.5% of structures produced by 3,4-addition of the diolefine. Another analytical measure of the similarity of the present polymer to Hevea rubber is the net cis - 1,4–unsaturation value, explained below. For the polymers produced in accordance with this invention, this value may be 85% or better, indicative of high regularity.

(2) They are extremely high in cis-1,4-addition, usually containing about 93% or more of the diolefine polymerized in this configuration.

(3) They form crystalline complexes with silver nitrate similar to complexes formed by Hevea rubber.

(4) The uncured, gel-free, polymer can be stretched to yield X-ray fiber diagrams.

(5) The amorphous rings in X-ray diagrams taken at low temperature with the polymers of this invention in stretched condition were less intense, in relation to the spots of the fiber diagram, than with any other comparable synthetic polymer.

(6) The polymers of this invention have much greater strength in the uncured state.

(7) The vulcanizates of the polymers produced in accordance with this invention are characterized by high tensile strength without sacrifice of modulus or elongation properties.

(8) The polymers produced in accordance with this invention exhibit evidence of crystallization upon simple exposure to cold.

These fundamental chemical and physical similarities of the polyisoprenes produced in accordance with this invention to Hevea rubber are reflected in technically useful behavior and properties of the polyisoprenes; they have the excellent tack and working strength of Hevea rubber, and yield vulcanizates having the excellent tensile strength, elongation at break and low internal friction properties of Hevea rubber.

THE DIOLEFINES EMPLOYED

Diolefines suitable for use in this invention include (the preferred) isoprene, butadiene, 2-methyl-1,3-pentadiene, 2,3-dimethyl butadiene, cyclopentadiene, and the like. It will be understood that mixtures of diolefines indicated as being satisfactory may also be used.

The diolefines employed in this invention should be of a high degree of purity for use in the practice of this invention. It is desirable that the diolefine should be of at least more than 90 mole percent purity and preferably in the neighborhood of 95 or more mole percent purity. In general, the purer the diolefine, the faster the reaction rate and the closer the structure and the properties of the resulting polymer to natural rubber. Acetylenic compounds, or other compounds containing reactive hydrogen which tend to reduce the effective catalyst concentration or to act as chain terminators should be kept at a minimum or removed prior to use, since they use up catalyst and also tend to lower the molecular weight of the resulting polymer. Any inhibitor normally present in a commercial diolefine must be removed by conventional techniques prior to polymerization in accordance with the invention.

Excellent polymers in accordance with the invention are produced from Pure Grade [1] or Research Grade [2] isoprene.

The only purification required of these monomers prior to use is removal of inhibitor therefrom. Desirable polymers in accordance with the invention are also produced from a less pure grade of isoprene [3] which has a purity of about 91–93% and contains minor amounts of alkyl acetylenes and various other unsaturates, provided the acetylenic compounds are removed and the unsaturated impurities are reduced by well known chemical and fractionating methods to produce a monomer having a purity of about 95% and an index of refraction at 20° C. in the range of about $n_D^{20}=1.4210$ to 1.4216. A final refinement which has been found particularly suitable consists in refluxing the isoprene with sodium or other alkali metal sand, and then distilling the isoprene away from the sand.

Moisture, oxygen and other components of the atmosphere tend to use up catalyst, and to inhibit polymerization and should preferably be kept to a minimum in the reaction zone. To this end it is usually desirable that the diolefines be handled at all times in contact only with their own vapors or with atmospheres containing only their own vapors and inert gases such as helium or argon. Particularly to be avoided is the presence of compounds such as ethers, esters, amines and the like, which are sometimes considered to be indispensable constituents of alkali-metal-based catalyst systems; these compounds should be rigorously excluded from the reaction mixtures of this invention.

---

[1] Supplied by Phillips Petroleum Company, Bartlesville, Okla., and represented as having a purity of 99 mole percent and a refractive index at 20° C. of $n_D^{20}=1.422$.
[2] Supplied by Phillips Petroleum Company and represented as having a purity of 99.6 mole percent and a refractive index at 20° C. of $n_D^{20}=1.422$.
[3] Supplied by Enjay Company, Inc.

SOLVENT SYSTEMS

The process of this invention may be carried out as a mass polymerization, in which the monomeric materials are contacted with the catalyst in substantially undiluted state, or may be carried out as a solution polymerization in which the reactants are dissolved and/or dispersed in a suitable inert solvent. Any solvent to be used in the process of this invention must be a non-polar, non-acidic organic solvent. Suitable solvents include the saturated aliphatic hydrocarbon solvents such as the straight and branched-chain paraffins and cycloparaffins containing from 3 to 16 carbon atoms, such as propane, pentane, hexane, heptane, dodecane, petroleum ether, cyclopentane, cyclohexane, methyl cyclohexane and the like. The same considerations as to purity and absence of interfering compounds apply to the solvent as to the monomeric isoprene. A treatment which has been found particularly advantageous for the purification of paraffin solvents such as petroleum ether consists in agitating them with concentrated sulfuric acid, and thereafter repeatedly washing them with water. The solvents may then be dehydrated by passage through a silica gel, alumina, calcium chloride or other dehydrating and adsorbing column, and thereafter distilling. Similarly as in the case of isoprene, the solvent after purification should preferably be handled in contact only with its own vapor or with atmospheres containing only its vapor and inert gases such as helium or argon.

COMONOMERS

As noted above, in addition to being polymerized alone, the diolefines may also be copolymerized with other unsaturated compounds copolymerizable therewith. In general, it is preferred that the copolymerized compounds should constitute not over 25%, based on the total weight of the diolefine plus the copolymerized compounds, as such polymers approach closest to the properties of Hevea rubber. However, in any copolymers produced by the process of this invention from monomer mixtures containing a significant amount, say 10% or more, of a diolefine, the diolefine-derived portion of the polymer chain will possess a microstructure comparable to that of Hevea rubber, and the copolymers as a whole will exhibit properties distinguishing them from comparable conventionally produced copolymers. Compounds suitable for copolymerization with diolefines in the practice of this invention include polymerizable ethylenically unsaturated compounds such as styrene, alpha-methyl styrene, and the like. The comonomers should be free of ether, nitrile, nitro and other highly negative groups. It will be understood, of course, that the same standards for purity should be maintained for the comonomers as for the diolefine and solvent.

THE LITHIUM-BASED CATALYST COMPONENT (A)

The lithium-based component (A) of the catalysts of this invention may be metallic lithium, organolithium compounds, or other compounds of lithium in which the lithium exerts a sufficiently strong reducing action as to displace hydrogen from water. "Organo-lithium compounds," as used herein, include the various lithium hydrocarbons, i.e., hydrocarbons in which one or more hydrogen atoms have been replaced by lithium, and adducts of lithium with polycyclic aromatic compounds. Suitable lithium hydrocarbons are for instance alkyl lithium compounds such as methyl lithium, ethyl lithium, butyl lithium, amyl lithium, hexyl lithium, 2-ethylhexyl lithium and n-hexyldecyl lithium. In addition to the saturated aliphatic lithium compounds, unsaturated compounds are also suitable such as allyl lithium, methallyl lithium and the like. Aryl, alkaryl and aralkyl lithium compounds such as phenyl lithium, the several tolyl and xylyl lithiums, alpha- and beta-naphthyl lithium and the like are also suitable. Mixtures of the various hydrocarbon lithium compounds are also suitable. For instance, a catalyst can be prepared by reacting an initial hydrocarbon lithium compound successively with an alcohol and with an olefine such as isopropylene (i.e., a technique analogous to the "Alfin" technique) whereby a greater or lesser proportion of the lithium from the initial hydrocarbon goes to form a lithium alkoxide and to form a new organolithium compound with the olefine. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, pentamethylene dilithium, hexamethylene dilithium, decamethylene dilithium, octadecamethylene dilithium and 1,2-dilithium propane. Other suitable polylithium hydrocarbons are polylithium aryl, aralkyl and alkaryl compounds such as 1,4-dilithium benzene, 1,5-dilithium naphthalene, 1,2-dilithium-1,3-triphenyl propane, the compound of the formula

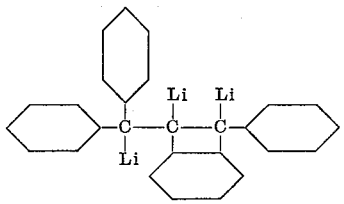

and the like. Tri- and higher lithium hydrocarbons are also suitable, such as 1,3,5-trilithium pentane or 1,3,5-trilithium benzene. Other compounds include the various lithium hydrocarbon amides. Lithium hydride is also suitable. Likewise, there may be employed the lithium-polynuclear aromatic hydrocarbon adducts produced by simply reacting lithium metal with naphthalene, anthracene and the like polynuclear aromatic hydrocarbons. The hydrocarbon acquires a negative charge without losing any of its hydrogens, and serves as the anion, the lithium losing an electron to serve as the cation, of the salt. It should be understood that metallic lithium or the various lithium compounds may be used either alone, or in any combination as mixtures with each other, as the component (A) of the composite catalysts of this invention.

As to the amount of catalyst, in general the larger the amount of catalyst used, the more rapidly the polymerization will proceed and the lower the molecular weight of the product. In general, there should be employed an amount of the composite catalyst such as to contain from about 0.001 to about 1.0 gram of lithium element for each 100 grams of monomer in the polymerization mixture. Preferably the smallest suitable amount of catalyst will be used, which ordinarily will not contain more than about 0.5 gram of lithium element per 100 grams of monomer.

In case metallic lithium is to be used in the catalyst, the metal is melted, immersed in for example petroleum jelly, and the molten mass is subjected, while maintaining same above the melting point of lithium, to high speed agitation under an inert atmosphere to produce finely divided metallic lithium dispersed in the petroleum jelly. The function of the petroleum jelly is to prevent air from contacting the lithium metal; any other medium which will perform this function is also suitable, such as other inert hydrocarbon solvents which boil above 200° C., e.g. mineral oil, paraffin and the like. It should be understood that high speed agitation is not the only means of providing metallic lithium in a finely divided state; any other means of producing lithium of relatively finely divided state is suitable. The preparation of the metallic lithium catalyst should be carried out in a closed container of nonreactive material, such as stainless steel or the like. Suitably, a high speed stirrer provides the agitation. Excellent results have been obtained with metallic lithium catalyst dispersions produced as above, wherein the particles of lithium had a mean diameter of about 20μ, or a surface area of about one square meter per gram.

Organolithium compounds, suitable as catalysts in the practice of the invention, are produced in any desired manner. A convenient preparation of hydrocarbon lithiums involves reaction of metallic lithium with a hydrocarbon halide. In the event that one desires to use a hydrocarbon lithium amide as a catalyst, one can easily produce such a compound by reacting a hydrocarbon lithium with a secondary amine to produce the corresponding amide.

CATALYST COMPONENT (B)

In general these will be substances providing a large surface area having ordered distribution of charges thereon so as to exert a directive and marshalling action on the monomers during the polymerization. For instance, the lithium chloride by-product obtained by reacting lithium with chlorohydrocarbons consists of a matrix of lithium chloride containing metallic lithium dispersed therein in an extremely fine degree of subdivision. This composite material, when used as a catalyst for the polymerization of diolefines, yields polymers having improved microstructure. Likewise when lithium metal is intimately intermixed with oxide-coated metals, such as aluminum, iron, and the like, the combination produces polymers of enhanced microstructure. Particularly preferred substances are salts whose cations are electropositive metals and whose anions are complexes made up of heavy metals, boron, silicon or arsenic covalently linked to one or more negative groups so as to impart a negative charge to the group as a whole. In addition to the negative groups, the heavy metal may also have covalently linke dthereto relatively neutral groups such as alkyl, aryl or other hydrocarbon groups, carbonyl groups, hydrate ($H_2O$) groups, the hydride radical or the like. By the term "heavy metal" is understood all those elements enclosed by the bracket entitled "Heavy Metals" and by the heavy black lines terminating at said bracket (including the lanthanides) in the periodic chart given in Lange's "Handbook of Chemistry" Fifth Edition, Handbook Publishers, Inc. 1944, pages 54 and 55. These complex salts may in general be represented by the formula (I) $\qquad (M_{EP})_n[M_H]_o X_p A_q]_r$ wherein $M_{EP}$ is an electropositive metal
$M_H$ is a heavy metal, boron, silicon or arsenic
X is an electronegative radical covalently linked to $M_H$
A is a neutral radical covalently linked to $M_H$
$n$, $o$, $p$, $q$ and $r$ are integers, with the proviso that $q$ may be zero In general, although not necessarily, the maximum covalency, most commonly 6, will be elicited from the heavy metal $M_H$, so that if $V_H$=the covalency (usually the covalency maximum) of $M_H$
$V_X$=covalency of X
$V_A$=covalency of A then $$oV_H = pV_x + qV_a$$

Also if $E_E$=positive electrovalence of $M_{EP}$
$E_H$=positive electrovalence of $M_H$
$E_X$=negative electrovalence of X then $$nE_E = r(pE_X - oE_H)$$

Suitable elements which may be represented by $M_{EP}$ include any of the strongly electropositive metals, particularly the light metals such as lithium, sodium, potassium, rubidium, cesium, calcium, magnesium, and the like. Suitable elements which may be represented by $M_H$ include, as aforesaid, the heavy metal elements, boron, silicon and arsenic, typical examples of these being aluminum, titanium, mercury, vanadium, manganese, molybdenum, chromium, cobalt, iron, zinc, platinum, nickel, lanthanum, and the like. Suitable negative groups represented by the radical X are exemplified in fluorine, chlorine, bromine, iodine, oxygen and hydroxyl groups, hydrocarbon groups containing up to forty carbon atoms such as methyl, ethyl, propyl, butyl, pentyl, hexyl, phenyl and the like groups. Suitable neutral groups are exemplified in the carbonyl (CO) group, the hydrate ($H_2O$) group and the like. It will be understood that when any of the subscripts $n$, $o$, $p$, $q$, and $r$ are greater than one, the radicals to which they are appended need not be pure radicals but may be mixtures of radicals individually qualified for the positions they occupy. An extensive discussion of complexes is given in Ephraim "Inorganic Chemistry" Sixth Edition, Interscience Publishers Inc., Chapters 10, 11 and 12. Typical complex anions which may provide the anion group $(M_H)_o X_p A_q$ of the salts (I) are exemplified in those of the formulae:

$[AlCl_6]^{--}$   $[AlF_6]^{--}$   $[AlBr_6]^{--}$
$[AlI_6]^{--}$   $[AlOCl_4]^{--}$   $[Al(CH_3)Cl_5]^{--}$
$[ZnBr_4]^{--}$   $[ZnBr_3]^{--}$   $[PtCl_6]^{--}$
$[PdCl_6]^{--}$   $[SiF_6]^{--}$   $[SbCl_6]^{--}$
             V
$[UO_2Br_4]^{--}$   $[MoOF_5]^{--}$   $[TiF_6]^{--}$
$[AlCl_5(H_2O)]^{--}$   $[AlCl_4(H_2O)_2]^{-}$   $[TiCl_6]^{--}$
$[TiCl_5(C_5H_{11})]^{--}$   $[Ti^{III}Cl_5(C_2H_5)]^{--}$   $[PtCl_6]^{--}$
$[SiF_6]^{--}$   $[BF_4]^{-}$   $[ZnF_6]^{--}$
$[AlO_3]^{--}$   $[FeO_3]^{--}$   $[Ti^{II}Cl_6]^{--}$

Particularly good results are obtained with composite catalysts in which the complex salt (B) was formed in situ in contact with the lithium-based catalyst component (A) by reaction of excess metallic lithium, or of a covalent or other lithium compound in which the lithium exerts a sufficiently strong reducing action to displace hydrogen from water (all of these may conveniently be supplied by an excess of the lithium-based catalyst component (A), the excess left over from the reaction discussed below serving as the component (A) in the composite catalyst, and the reaction product serving as component (B)) upon a suitable heavy metal compound with reduction of the heavy metal; or conversely in which the metallic lithium or covalent lithium compound which is to serve as the lithium-based catalyst component (A) is generated in situ in contact with the complex salt component by reduction by a metal or covalent metal compound which is still more electropositive than lithium. The generalized reaction of lithium metal with a heavy metal compound to form such complexes is as follows:

(1)
$$uLi + v(M_H)_o X_p A_q \rightarrow Li_n[(M_H)_o X_p A_q]_r + M_H(\text{metallic}) + LiX$$
$$\quad\quad (II) \quad\quad\quad\quad (I) \quad\quad\quad\quad (III)$$

The above equation is not balanced, as the coefficients would unduly complicate the equation. The coefficients "$u$" and "$v$" will have values as required by the valences of the radicals involved. The notation is the same as that of Formula I above, with the addition of $o'$, which is an integer which may be different from $o$ to allow for changes in valency of $M_H$ and structure of the compounds in the course of the reaction. In some cases the heavy metal $M_H$ is not reduced to the free metallic state (III), in which case this term will not appear in the equation. Usually the lithium will be employed in excess, the unreacted portion supplying part or all of the lithium-based catalyst component (A). For instance, in a preferred embodiment, excess lithium metal is reacted with aluminum trichloride according to the reaction (2) $\quad 3Li + 2AlCl_3 \rightarrow LiAlCl_6 + Al(\text{metallic})$ The excess lithium metal may serve as the lithium-based catalyst component (A) of the composite catalyst.

As a measure of the excess lithium employed, a value designated as the "stoichiometric excess" was defined as (2.1) $\quad\quad S = \dfrac{[Li]}{[AlCl_3]} - \dfrac{3}{2}$ wherein $S$ = the stoichiometric excess value
$[Li]$ = moles of lithium used
$[AlCl_3]$ = moles of aluminum trichloride used In the case of complexes other than those made from lithium metal and aluminum chloride, the stoichiometric excess will be calculated by the formula (2.2) $\quad\quad \dfrac{[Li]}{[(M_H)_{o'} X_p A_q]} - \dfrac{u}{v} = S$ in the case of complexes made by reaction of lithium metal in accordance with Equation 1 above or (2.3) $\quad\quad \dfrac{[LiR]}{[(M_H)_{o'} X_p A_q]} - \dfrac{w}{x} = S$ in the case of complexes made by reaction of reducing lithium compounds in accordance with Equation 4 below. In equations (2.2) and (2.3)

$[Li]$ = moles of lithium used
$[(M_H)_{o'} X_p A_q]$ = moles of the compound $(M_H)_{o'} X_p A_q$ used
$[LiR]$ = moles of reducing lithium used, and
$u$, $v$, $w$ and $x$ are the coefficients in Equation 1 above or Equation 4 below.

It was found that best results were obtained when the values of S were at least 2, and preferably 6 or more, when no lithium aromatic adduct is used in addition to the simple complex as described below. Preferred proportions for this latter case are set out in connection with the discussion of lithium aromatic adducts below. There would be no theoretical upper limit, save that imposed by economics. Polymerizations have been run with values of S as high as 25. The reaction of the lithium or reducing lithium compound with the aluminum trichloride or other heavy metal compound takes place readily at ordinary temperatures, for instance by agitating the aluminum trichloride with finely divided lithium metal or compound. Analogous complexes may be produced by mixing and agitating metallic lithium or a lithium compound in which the lithium exerts a strong reducing action with oxides and halides of other appropriate metals. In some cases the oxide may be supplied as the oxide coating on the surface of metals, for instance aluminum powder, iron powder, zinc powder and the like, containing oxide coatings may be reacted with lithium metal to yield composite catalysts for use in this invention. In such cases the oxide coating, to the extent that it may not be wholly reacted, will itself act as a substance exerting a directive influence on the monomeric diolefines during the polymerization.

The hydrate group ($H_2O$) was noted hereinabove as being a suitable component to serve as the neutral radical A. This group appears to be of particular advantage in securing the more rapid formation of the complexes and faster polymerization rates when the heavy metal $M_H$ involved is aluminum, titanium or boron. For instance, a more or less completely hydrated aluminum chloride may be employed as the starting heavy metal compound (II), the reaction with aluminum chloride monohydrate probably proceeding somewhat as follows:

(3)
$$5Li + 2AlCl_3 \cdot H_2O \rightarrow Li_2[AlCl_5(H_2O)] + Al + LiCl + Li_2O + H_2$$
$$\quad\quad\quad\quad\quad\quad\quad\quad (VI)$$

The hydrogen atoms in the complex (VI) may probably be displaced to a greater or less extent by the lithium. Excellent results have been obtained with aluminum chloride containing 0.1 to 1.0 mole of water per mole of aluminum chloride. The same considerations of ratio of excess of lithium over aluminum chloride apply to the hydrated aluminum chloride as to the anhydrous aluminum chloride. Lithium will also react with boron fluoride hydrate ($BF_3.H_2O$) to yield efficient catalysts for use in this invention.

It was also brought out hereinabove that the complex might be made by the reducing action of covalent or other highly reducing lithium compounds such as lithium hydrocarbons or the like. In such cases the reaction may be written (4)

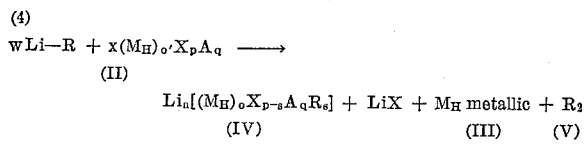

in which

R is a hydrocarbon radical, and
$s$ is an integer or zero

As in the case of reaction (1) above the free metal (III) may or may not appear, and the radicals R may all enter the complex (IV) rather than being liberated as the compound $R_2$ (V). In some cases the radicals R may not enter the complex (IV) at all, but may all appear in the compound $R_2$ (V). Particularly good results have been obtained by the reaction of lithium hydrocarbons (e.g., any of those described above as being suitable for use as the lithium-based catalyst component (A)) upon titanium tetrahalides. A variety of reductions and complex formations takes place, the following being typical, using the same notation as was employed above.

(5)

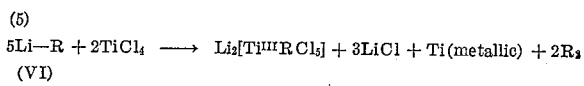

It will be understood that, similarly as in the case of the reaction of lithium metal with a heavy metal compound to form the complex salt, the lithium hydrocarbon may be supplied in excess, the unused portion thereof serving to supply part or all of the lithium-dependent catalyst component (A). Conveniently, an excess of 0.001 to 10 moles of lithium hydrocarbon per mole of complex may be used.

While, as stated above, it is preferred to employ complexes that have been formed in situ by reduction of heavy metal compounds, it will be understood that complexes formed by other methods may also be employed. For instance complexes may be formed by the reaction of a salt of a highly electropositive metal with a heavy metal compound, an example being the reaction of lithium chloride with aluminum chloride:

(6) $\quad 3LiCl + AlCl_3 \rightarrow Li_3(AlCl_6)$

Complexes produced by the above and similar reactions may be mixed with lithium based catalysts, to provide the composite catalysts of this invention.

As above noted, lithium reacts with polynuclear aromatic hydrocarbons such as naphthalene, anthracene, biphenyl and the like to form salt-like addition compounds without replacing hydrogen in the hydrocarbon, see Paul et al. J.A.C.S. 78, 116 (1956). When these compounds are used as the lithium-based components (A) in combination with complexes (B) previously formed in accordance with reactions (1) or (4) above, particularly advantageous results are obtained, and sensitivity of the process to minor contaminations and variations of procedure is greatly reduced. It is believed, without absolute commitment to this theory, that the slope of the adsorption curve of these lithium-aromatic compounds upon the surfaces of the complex compounds is very slight at the optimum concentrations for polymerization, so that unavoidable variations in the amount of the lithium-aromatic compound actually supplied (due to manipulative errors and/or destruction of the compound by oxygen or other contamination) will not greatly change the effective concentration of the lithium-aromatic compound in the theater of reaction. Suitable aromatic hydrocarbons forming addition products with lithium are exemplified in polynuclear aromatic, and alkylated aromatic, compounds, such as naphthalene, anthracene, chrysene, stilbene, diphenylmethane, fluorene, naphthacene, 1-methyl naphthalene, phenanthrene, acenaphthene, diphenyl, pyrene, triphenylene, dibenz(a,h)anthracene, graphite, carbon black and the like. The complex salt with which the lithium-aromatic hydrocarbon compound is used may have been prepared with a stoichiometric excess within the ranges cited for this variable above. The mole ratio of lithium-aromatic hydrocarbon compound to the complex salt may be varied upwardly, from extremely small values, of say .01, there being no theoretical upper limit. Especially good results are secured when the ratio of the total moles of lithium metal used in the preparation of the aluminum chloride complex, plus the moles of lithium adduct to the moles of aluminum chloride used in the preparation of the complex is in the range 3.00–4.00, and when the ratio of moles of lithium adduct to moles of aluminum chloride used in the preparation of the complex is in the range 0.01–0.25.

POLYMERIZATION AND POLYMER RECOVERY OPERATIONS

For small scale laboratory preparations, the polymerization reactions may conveniently be carried out in glass bottles sealed by crown caps lined with aluminum foil or other flexible, inert sheet material. Before use, the bottles should be dried, for instance by flaming and flushing with helium, argon or other inert gas. It is often desirable, even though the isoprene and solvent (if used) have been previously purified, to subject the materials to a last purification before charging, as for instance by passage through a silica gel adsorption column during the charging. Preferred solvents are aliphatic and aromatic hydrocarbon solvents such as pentane, hexane, heptane, petroleum ether, benzene, cyclopentane and the like. An atmosphere of inert gas such as helium, argon or the like is preferably maintained in the bottle during the charging, to avoid contact of oxygen with the monomer, and it will usually be desirable to complete the purging of oxygen from the system by allowing a portion of the isoprene to evaporate with the bottle loosely capped. The composite catalyst, which will usually be in the form of a readily flowable solution or suspension of the catalyst, is usually introduced last, just before sealing the crown cap. A hypodermic syringe is a convenient instrument for handling the catalyst, since it will keep the catalyst out of contact with the atmosphere. The sealed bottle may either be placed on a polymerizer wheel, arranged to dip and revolve the bottle in a water bath at the desired polymerization temperature; or, after brief shaking or other agitation to mix the catalyst with the other ingredients, the bottle may be allowed to stand quiescent in a medium maintained at the desired polymerization temperature. The polymerization will usually be complete in from 3 to 60 hours, depending on the temperature, catalyst concentration and other pertinent conditions. It is usually necessary to cut open the bottle to remove the polymer. Since the polymer contains no antioxidants, it is extremely susceptible to oxidation. A preferred method of shielding the polymer from oxidation consists in dropping it into a methanol, isopropanol or other alcoholic solution of an antioxidant and agitating the mixture. The alcohol serves as a vehicle for distributing the antioxidant, as an agent to destroy the catalyst, and causes the polymer to separate out from any solvent used in the polymerization mass. The separated polymer is then preferably washed with water on a roll mill, usualy with addition of further stabilizing agents, and dried.

Corresponding techniques should be used in large scale polymerizations according to this invention. Usually the reaction will be carried out in a closed autoclave provided with a heat-transfer jacket and with a rotary agitator. Avoidance of oxygen contamination is most easily secured by evacuating the vessel prior to charging the isoprene and solvent (if used) and evaporating and venting a portion of the charge to sweep out any traces of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature which will usually be maintained between 0° and 150° C., preferably between 30° and 80° C. Upon completion of the polymerization, the polymerization mass is removed, immersed under the surface of a body of methanol, isopropanol or other alcohol containing an antioxidant, and agitated therewith to precipitate the polymer, destroy the catalyst and incorporate the antioxidant. The precipitated mass may be milled with water on a wash mill to remove the alcohol, additional antioxidant being incorporated during this operation. The product is then dried for storage and use.

THE INFRA-RED DATA

The data given hereinbelow as to the proportions of cis-1,4-; trans-1,4-; 1,2- and 3,4-additions in the products of this invention were determined by infra-red analysis. The relative amounts of the four structures named are found by means of measuring the intensities of the infra-red absorption bands at 8.85, 8.68, 10.98 and 11.25 microns for the four types of structures in the order given, and inserting these values into the equation:

$$D^i = e_1^i C_1 + e_2^i C_2 + e_3^i C_3 + e_4^i C_4$$

where $D_i$ = absorbance (optical density) of the polymer at wavelength $i$ $e_{1,2,3 \text{ or } 4}^i$ = the absorptivities of the several structures at wavelength $i$, the subscripts 1,2,3 and 4 referring to the several component structures, and $C_{1,2,3 \text{ or } 4}$ = the concentrations of the several structures, the subscripts 1,2,3 and 4 referring to the several component structures.

The four equations obtained in this way are solved for $C_1$, $C_2$, $C_3$ and $C_4$, the values of the concentrations of the cis-1,4-; trans-1,4-; 1,2-addition and 3,4-addition components of the polymer.

The peak wavelengths selected, and the values of the absorptivities $e^i$ for these wavelengths for the several structures, are tabulated herewith:

|  | Molar Absorptivities $e^i$ at Wavelength of— | | | |
| --- | --- | --- | --- | --- |
|  | 8.68 microns | 8.85 microns | 10.98 microns | 11.25 microns |
| 1,2-addition | 3.531 | 3.531 | 149.0 | 10.199 |
| 3,4-addition | 1.541 | 1.815 | 7.363 | 145.0 |
| Cis-1,4-addition | 3.583 | 6.518 | 1.860 | 1.530 |
| Trans-1,4-addition | 5.927 | 1.934 | 2.277 | 1.885 |

Percentage values for the various types of addition products, based on the total polymer, are derived by dividing the absolute concentration of each type of component by the sum of the concentrations of the four types of components (1,2-; 3,4-; cis-; and trans-) determined and multiplying by 100%, so that the sum of the percentages given will always be 100%. A further percentage figure is also given, namely "total unsaturation found." This is the quotient of the sum of the concentrations of the various components found by infra-red analysis, divided by the concentration of the solution used in the analysis, which is found by determining the total solids. A total found value above about 95% probably indicates a measure of error in the analysis. Values below 95% probably indicate that the difference between this figure and 100% represents isoprene polymerized in structures other than the cis-1,4-; trans-1,4-; 1,2- and 3,4- modes of addition; and the "net" values of the proportions of these structures will be given by multiplying the given figures by the total unsaturation found. Thus, if the cis-1,4-unsaturation is reported as 91%; and the total unsaturation found is given as 95%; then the net cis-1,4-unsaturation will be 95% of 91% or 86.4% net cis-1,4-unsaturation. The net cis-1,4-unsaturation has been found to be an important criterion of the excellence of the polymers; in general polymers having a net cis-1,4-unsaturation of 85% or better will resemble Hevea rubber in that they will form crystalline complexes with silver nitrate, and will form vulcanizates having excellent hot strength and modulus.

With the foregoing general discussion in mind, there are given herewith detailed examples of the practice of this invention. All parts given are by weight.

Example 1

(A) Preparation of catalyst:

| | |
| --- | --- |
| Aluminum trichloride grams | 1 |
| Lithium dispersion (35% dispersion of lithium in vaseline) grams | 2.45 |
| Petroleum ether ml | 100 |

The above ingredients were charged into a flask previously purged with helium and provided with an agitator. The ingredients were agitated together at 25° C. for 15 hours.

(B) Polymerization:

| | |
| --- | --- |
| Isoprene grams | 30 |
| Catalyst suspension (prepared as above described) ml | 1 |
| Pentane grams | 90 |

The above ingredients were charged into a six-ounce polymerization bottle which had previously been flamed and purged with helium. The bottle contained a magnetic stirring bar. The bottle was capped, magnetic stirring commenced, and the temperature raised to 55° C. At the end of three hours, polymerization had set in, whereupon the temperature was dropped to 20° C. and stirring continued as long as this was possible. At the end of 18 hours since the beginning of the operation, the bottle was cut open and the polyisoprene solution was precipitated by adding isopropanol containing 2% of mercaptobenzimidazole (to protect against oxidation). The coagulum was then washed free of isopropanol on a wash mill and dried in a vacuum oven at 50° C. for 18 hours.

The resultant polymer on infra-red analysis showed 93.9% cis-1,4-; 0.7% trans-1,4-; 0.0% 1,2-; and 5.3% 3,4-addition, the total unsaturation found being 92.6%. An X-ray fiber diagram similar to that of Hevea rubber was obtained from stretched samples of the uncured polyisoprene, and also from vulcanizates thereof. When soaked in an ethanol-toluene-water solution of silver nitrate for 24 hours, the polymer formed a complex which gave the same X-ray diagram as a similarly treated specimen of Hevea rubber.

(C) Compounding and vulcanization:

| | Parts |
| --- | --- |
| Polyisoprene (prepared as just described) or pale crepe Hevea rubber | 100 |
| Antioxidant | 1 |
| Stearic acid | 4 |
| Zinc oxide | 6 |
| Sulfur | 3 |
| Mercaptobenzothiazole | 0.5 |

Two compositions were made up in accordance with the above schedule, using the polyisoprene in one composition and pale crepe in the other. Specimens were cured at 260° F. for periods of 30, 45 and 60 minutes. Set forth herewith are the properties of the vulcanizates.

TABLE I

|  | Rubber | |
| --- | --- | --- |
|  | Hevea | Polyisoprene |
| 600% Modulus (pounds per sq. in.): |  |  |
| Cured 30 min | 500 | 32 |
| Cured 45 min | 1,150 | 80 |
| Cured 60 min | 1,375 | 825 |
| Tensile Strength (pounds per sq. in.): |  |  |
| Cured 30 min | 2,125 | 2,800 |
| Cured 45 min | 2,825 | 3,000 |
| Cured 60 min | 3,575 | 3,175 |
| Elongation at break (percent): |  |  |
| Cured 30 min | 810 | 850 |
| Cured 45 min | 760 | 780 |
| Cured 60 min | 760 | 760 |

The polyisoprene compound of this example was molded into an atomizer and vulcanized at 260° F. for 60 minutes. The resultant bulb was attached to an atomizer and gave excellent service.

*Example II*

A number of runs were made, using the procedure of Example I, using aluminum chloride and other substances which form complexes when reacted with lithium, and varying the proportions of these ingredients, as set forth in Table II. Also tabulated in Table II are the polymerization conditions and the infra-red analyses of the polymers.

*Example IV*

(A) Preparation of catalyst:
Aluminum trichloride _____grams__ 50
Water _____ml__ 5.1
Lithium dispersion (suspension in white petrolatum, contains 35% of lithium by weight)
_____grams__ 70
Petroleum ether _____ml__ 500

The foregoing recipe provides .75 mole of water per mole of aluminum trichloride. The excess lithium, above that required to react according to Equation 2 above and also to decompose the water (assuming that this occurs) amounts to 7.1 moles of lithium per mole of aluminum trichloride.

A round-bottom flask provided with a magnetic stirring bar was employed in this preparation. The aluminum trichloride and water were charged first, followed by the petroleum ether and (with helium flushing and stirring) the lithium dispersion. The reaction mass was stirred at 25° C. for 15 hours, and then pressured over by means of helium into a storage bottle which had previously been flamed and flushed with helium.

(B) Polymerization: Ml.
Isoprene (Phillips Petroleum Co. Pure grade, refluxed over sodium) _____ 150
Petroleum ether _____ 450
Catalyst (prepared as just described contains .037 g. excess lithium per ml.) _____ 2.5

The above ingredients were charged into a 28-ounce beverage bottle which had previously been flamed and flushed with helium, and which was provided with a

TABLE II

| Catalyst Ingredient [1] | | | Isoprene Used (grams) | Pentane Used (grams) | Polymerization Temperature, °C. | | Proportions of Structures Found by Infra-Red Analysis (Percentages) | | | | |
| --- | --- | --- | --- | --- | --- | --- | --- | --- | --- | --- | --- |
| Lithium (grams) | Material Reacted with Lithium | (Grams) | | | At Outset | After Polymerization Began | Cis-1,4- | Trans-1,4- | 1,2- | 3,4- | Total Found |
| 0.085 | AlCl$_3$ | 2.6 | 100 | 300 | 55 | 55 | 93.1 | 0 | 0 | 6.9 | 90.6 |
| 0.56 | AlCl$_3$ | 2.6 | 100 | 300 | 55 | 25 | 93.2 | 0 | 0.2 | 6.6 | 89.2 |
| 0.35 | TiCl$_4$ | 1.73 | 100 | 100 | 60 | 60 | 92.9 | 0 | 0 | 7 | 90.5 |
| 0.06 | {Aluminum powder [2] | 0.023 | 100 | 300 | 50 | 35 | 94.3 | 0 | 0 | 5.6 | 91.5 |
|  | {Silicon carbide | 0.035 |  |  |  |  |  |  |  |  |  |
| 0.15 | Aluminum powder [2] | 0.25 | 100 | 300 | 70 | 70 | 88.3 | 2.1 | 0.2 | 9.4 | 99.9 |
| 0.15 | Zinc powder [2] | 0.35 | 100 | 300 | 70 | 70 | 90.0 | 0.0 | 0.2 | 9.9 | 97.8 |
| 0.15 | Iron powder [2] | 0.35 | 100 | 300 | 70 | 70 | 90.5 | 0.0 | 0.2 | 9.3 | 97.8 |

[1] These figures relate to the amounts of the ingredients actually entering the polymerization vessel. The catalysts were prepared on a moderately large scale from larger quantities of starting materials, and the catalyst used and recorded in the table is an aliquot portion of the large-scale preparation.
[2] The action of these catalysts appears to be due to the action of the lithium upon the oxide coating on the metal powders. Also the oxide coating itself appears to exert some directive influence upon the polymerizing mixture.

*Example III*

|  | Ml. |
| --- | --- |
| Petroleum ether | 250 |
| Isoprene | 100 |
| Lithium amyl (6.75×10$^{-4}$ moles Li/Ml.) | 20 |
| Titanium tetrachloride (1 molar solution) | 5 |

The above ingredients were charged, in the order named, into a beverage bottle having a magnetic stirring bar therein. Helium flushing was maintained throughout the charging. The bottle was capped and placed in a brine bath maintained at −20° C., a magnetic stirring device being arranged below the bath to activate the bar in the bottle. The reaction was continued for 18 hours, after which the bottle was cut open and the contents dropped into isopropanol containing an antioxidant to precipitate the polymer. The polymer had a gel content of 31.0%, and an intrinsic viscosity of 3.54. Infra-red analysis indicated that the polymer contained 96.5% cis-1,4-; 0.0% trans-1,4-; 0.0% 1,2-; and 3.5% 3,4-unsaturation, the total unsaturation found being 88.6%.

magnetic stirring bar. The bottle was then capped and placed in a water bath provided with a magnetic stirrer at 55° C. for 5 days. The bottle was then removed and cut open, and the polymer removed and dropped into isopropanol to precipitate the polymer. The precipitated polymer was then washed with water on a wash mill, 2.5 parts of an antioxidant being added on the mill to stabilize the polymer. Infra-red analysis indicated that the polymer contained 94.4% cis-1,4-; 0.0% trans-1,4-; 0.3% 1,2-; and 5.3% 3,4-unsaturation, the total unsaturation found being 95.3%.

*Example V*

(A) Preparation of catalyst:
n-Heptane _____ml__ 150
Water _____ml__ 2
Lithium dispersion (35% dispersion in petrolatum)
First portion _____g__ 1
Second portion _____g__ 1
Third portion _____g__ 1

(A) Preparation of catalyst:
Fourth portion _____ g__ 2
Fifth portion _____ g__ 7
Boron trifluoride gas A flask provided with a stirrer and a sparger for introduction of gases under the liquid level of the flask was used in this preparation. The flask was also provided with a glass stoppered opening for flushing the flask with helium, and a cooling bath. The heptane and water were charged, and boron trifluoride bubbled into the mixture with stirring for one-half hour. Thereafter, the first three portions of the lithium dispersion were added at half-hour intervals, stirring and introduction of boron trifluoride being continued during the intervals between the additions and for one-half hour after the last addition. Introduction of boron trifluoride was then discontinued, the fourth portion of lithium suspension added, and the entire mixture stirred for a further 18 hours at 25° C. The entire mixture was then pressured by means of helium into a storage bottle which had previously been flamed and flushed with helium. Titration with HCl indicated that the catalyst contained 0.0063 g. of excess lithium per ml.

(B) Polymerization:
Isoprene _____ grams__ 60
Petroleum ether _____ do___ 125
Catalyst (prepared as just described) ____ ml__ 2.0

The above ingredients were charged and sealed into a polymerization bottle which had previously been flushed with helium and provided with a magnetic stirring bar. The bottle was placed in a bath having a magnetic stirrer, the temperature of the bath being 55° C., which temperature was lowered to 30° C. after two hours, at which time it appeared that the induction period was ended. The reaction was continued at 30° C. for four days, at the end of which time the bottle was cut open and the polymer recovered as in the preceding example. Infra-red examination indicated that the polymer contained 94.3% cis-1,4-; 0.2 trans-1,4-; 0.0% 1,2-; and 5.6% 2,3-unsaturation, the total unsaturation found being 93.3%.

*Example VI*

(A) Preparation of catalyst:
Petroleum ether (saturated with water)__ml__ 150
Titanium tetrachloride _____ ml__ 4.1
n-Heptane _____ ml__ 25
Lithium dispersion (35% dispersion in petrolatum) _____ grams__ 6

The petroleum ether was cooled to 0° C., and the titanium tetrachloride added. Thereafter the heptane and lithium dispersion were added, and the mass agitated for one hour. The product was then transferred to a storage bottle which had previously been flushed with helium.

(B) Polymerization:
Petroleum ether _____ grams__ 225
Isoprene _____ do___ 75
Catalyst (prepared as just described) ___ml__ 2

The above ingredients were charged into a polymerization bottle which was then flushed with helium and sealed. The bottle contained a magnetic stirring bar and was placed in a bath at 50°–55° C., for 24 hours, a magnetic stirrer being disposed below the bath. The bottle was then cut open and the polymer recovered as in the preceding examples. Infra-red examination indicated that the polymer contained 91.8% cis-1,4-; 1.8% trans-1,4-; 0.0% 1,2-; and 6.4% 2,3-unsaturation, the total unsaturation found being 91.3%.

*Example VII*

(A) Preparation of catalyst:
Aluminum trifluoride monohydrate
($AlF_3 \cdot H_2O$) _____ g__ 5.62
n-Heptane _____ ml__ 200
Lithium dispersion (35% dispersion in petrolatum) _____ g__ 7.40

A flask provided with a stirrer and with connections for flushing the free space above the liquid level with helium was used in this preparation. The aluminum fluoride and n-heptane were charged first, and stirring and flushing with helium commenced. The lithium dispersion was then added, and the mass stirred for 1 hour. The mass was then transferred to a storage bottle previously flushed with helium.

The above recipe provides an excess of 3.2 moles of lithium per mole of aluminum trifluoride monohydrate, assuming a reaction analogous to reaction (2) above with the aluminum trifluoride, and replacement by lithium of all hydrogen in the water of hydration.

(B) Polymerization:
Ml.
Petroleum ether _____ 250
Isoprene _____ 75
Catalyst (prepared as just described) _____ 5

The above ingredients were polymerized, and the polymer recovered, as in Example VI. Infra-red analysis showed 91.1% cis-1,4-; 3.5% trans-1,4-; 0.0% 1,2-; and 5.4% 3,4-unsaturation, the total unsaturation found being 100.3%.

*Example VIII.—Mixed catalysts*

(A–I) Preparation of Catalyst I:
Lithium dispersion (35% dispersion in petrolatum) _____ grams__ 3.5
Petroleum ether _____ ml__ 150
Aluminum chloride _____ grams__ 8.0
Ethyl bromide
First portion _____ ml__ 3.3
Second portion _____ ml__ 2.0

A flask provided with a stirrer, reflux condenser and connection for continuous flushing with helium was used in this run. The lithium dispersion, petroleum ether and aluminum chloride were charged first and stirred with reflux for 24 hours. The first portion of ethyl bromide was then added, stirring continued for 2 hours, the second portion of ethyl bromide added, and stirring continued for a further 6 hours. The reaction mass was then cooled and pressured into a storage bottle. Assuming all reactions completed, the product contained $1.1 \times 10^{-4}$ moles free lithium, $3.55 \times 10^{-4}$ moles of ethyl lithium, and $3.00 \times 10^{-4}$ moles of lithium chloroaluminate per ml.

(A–II) Preparation of Catalyst II:
Aluminum chloride _____ grams__ 1.0515
Lithium dispersion (35% dispersion in petrolatum) _____ do____ 1.32
n-Heptane _____ ml__ 150

The above materials were charged into an 8-ounce beverage bottle provided with a magnetic stirring bar. The bottle was flushed with helium, capped and placed in a bath maintained at 85° C. on a magnetic stirrer, and the contents permitted to react for 24 hours. The bottle was then cooled, and the contents used as a catalyst as described below. The catalyst contained $4.0 \times 10^{-3}$ grams of lithium per ml. and the stoichiometric excess value was 10.8.

(B) Preparation of polymer:
Isoprene _____ grams__ 30
Petroleum ether _____ do____ 90
Catalyst I (prepared as above described) __ml__ 2
Catalyst II (prepared as above described) __ml__ 2

The above ingredients were charged into an 8-ounce beverage bottle provided with a magnetic stirring bar. The bottle was flushed with helium, sealed and placed in a bath maintained at 55° C. on a magnetic stirrer, polymerization set in after an induction period of 1 hour, after which the bottle was removed from the bath and the reaction was continued for 24 hours with the bottle in an ambient atmosphere at 25° C. The polymer was recovered as in the preceding examples.

| | Parts | |
|---|---|---|
| | Stock No. 1 | Stock No. 2 |
| (C) Vulcanization: | | |
| Hevea natural rubber | 100 | |
| Polyisoprene (prepared as just described) | | 100 |
| Antioxidant | 1 | 1 |
| Stearic acid | 4 | 4 |
| Zinc oxide | 6 | 6 |
| Sulfur | 3 | 3 |
| Mercaptobenzothiazole | 0.5 | 0.5 |
| 600% Modulus (pounds per sq. in.) cured for— | | |
| 15 minutes | 475 | |
| 30 minutes | 1,050 | 50 |
| 45 minutes | 1,550 | 250 |
| 60 minutes | 1,900 | 450 |
| 90 minutes | 2,300 | 850 |
| 105 minutes | 2,275 | 1,000 |
| Tensile strength (pounds per sq. in.) cured for— | | |
| 15 minutes | 2,500 | |
| 30 minutes | 3,200 | 1,200 |
| 45 minutes | 4,300 | 2,600 |
| 60 minutes | 3,700 | 3,450 |
| 90 minutes | 3,950 | 3,700 |
| 105 minutes | 3,600 | 3,300 |
| Elongation, (percent) cured for— | | |
| 15 minutes | 860 | |
| 30 minutes | 780 | 1,210 |
| 45 minutes | 780 | 970 |
| 60 minutes | 730 | 860 |
| 90 minutes | 680 | 790 |
| 105 minutes | 720 | 760 |

Stocks Nos. 1 and 2 were compounded in accordance with the foregoing schedule, and specimens thereof cured at 260° F. for periods of time as listed. The properties of the compositions are tabulated above, and it will be seen that vulcanizates of the synthetic polymers of this invention are comparable in properties with vulcanizates of natural Hevea rubber, notwithstanding that the compounds are gum stocks rather than reinforced stocks.

*Example IX.—Lithium naphthalenide-titanium tetrachloride complex catalyst*

(A) Preparation of lithium naphthalenide:
Diethyl ether _____ ml__ 100
Naphthalene _____ grams__ 12
Lithium dispersion _____ do____ 2

The above ingredients were agitated together under a blanket of helium for 72 hours at 25° C. The mass was then subjected to distillation under a pressure of 15–20 mm. absolute pressure n-heptane being continuously added to the mass so as to replace the diethyl ether with n-heptane. The mass was then transferred to a storage bottle. Titration indicated that the mass was 0.56 molar in lithium.

(B) Polymerization: Ml.
Petroleum ether _____ 225
Isoprene _____ 75
Lithium naphthalenide dispersion (prepared as just described) _____ 6
Titanium tetrachloride solution (1 colar) ____ 1

The foregoing recipe provide a ratio of Li/TiCl$_4$=3.36. The ingredients were charged into a 28-ounce beverage bottle provided with a magnetic stirring bar, and the bottle was flushed with helium and sealed. The bottle was then placed for 18 hours in a water bath maintained at 55° C. and provided with a magnetic stirrer. The resultant solution of polymer was treated to recover the polymer as in the preceding examples. Infra-red analysis indicated that the polymer contained 91.8% cis-1,4-; 2.5% trans-1,4-; 0.0% 1,2-; and 5.7% 3,4-unsaturation, the total unsaturation found being 94.4%.

*Example X.—Catalyst on a carrier*

(A) Preparation of catalyst:
Finely divided silica ("Cabosil" a product of Godfrey L. Cabot, Inc.; having a surface area of 175–200 square meters per grams)
_____ grams__ 15
Aluminum trichloride _____ do____ 3.0
Petroleum ether
First portion _____ ml__ 150
Second portion _____ do____ 25
Lithium dispersion (35% dispersion in petrolatum)
First portion _____ grams__ 2.02
Second portion _____ do____ .70

A flask having a stirrer and a connection for continuously flushing the free space therein with helium was provided for this preparation. The silica, aluminum trichloride and first portion of aluminum trichloride were charged and agitated together for 1 hour. The first portion of lithium dispersion was then added and stirring continued for 1 hour. The second portions of lithium dispersion and of petroleum ether were added next, and agitation continued for a further hour. The entire mass was then pressured over into a storage bottle and diluted with petroleum ether to a total volume of 380 ml.

(B) Polymerization:
Isoprene _____ grams__ 75
Petroleum ether _____ parts__ 225
Catalyst (prepared as just described) ____ ml__ 1.0

The above ingredients were charged and seated into a 32-ounce beverage bottle, previously flushed with helium and provided with a stirring bar. The bottle was then placed in a bath at 55° C. on a magnetic stirrer for 3 days. The bottle was then cut open and the polymer recovered by dropping the solution into isopropanol, followed by washing with water on a wash mill with addition of an antioxidant.

*Example XI*

Isoprene _____ grams__ 30
Petroleum ether _____ do____ 90
Catalyst I (prepared as described in Example VIII at A–I above) _____ ml__ 0.5

The above ingredients were charged and sealed into an 8-ounce beverage bottle previously flushed with helium and provided with a stirring bar. The bottle was placed in a bath at 40° C. on a magnetic stirrer for 10 minutes, at the end of which time polymerization had begun. The bottle was then removed and allowed to stand in an ambient atmosphere at 25° C. for 7 days. The polymer was recovered in the preceding examples. Infrared analysis indicated that the polymer contained 93.7% cis-1,4-; 0.0% trans-1,4-; 0.0% 1,2-; and 6.3% 1,4-unsaturation, the total unsaturation found being 91.7%.

*Example XII*

(A) Preparation of catalyst:
Aluminum chloride _____ grams__ 10.93
n-Heptane _____ ml__ 150
Water _____ do____ 1.5
Lithium dispersion (35% lithium in petrolatum)
First portion _____ grams__ 10.7
Second portion _____ do____ 1.5

The aluminum chloride, heptane and water were charged into a flask provided with an agitator and a connection for flushing the free space with helium. The ingredients were agitated together for 1 hour, after which the first portion of lithium dispersion was added. The mixture was agitated for another hour, the second portion of lithium added, and the mixture agitated for an hour further. The entire mixture was then diluted with n-heptane to a volume of 250 ml. Assuming reaction of the lithium with the aluminum trichloride and the water, the stoichiometric excess value was 5.4, and the concentration of free lithium in the diluted mixture was .00895 gram per ml.

| | Ml. |
|---|---|
| Lithium-aluminum chloride-water reaction product (prepared as just described) | 50 |
| Suspension of mixed hydrocarbon lithiums (containing pentamethylene dilithium and amyl lithium in the ratio of 4:1, the lithium content being 0.029 g. lithium per ml.) | 2 |

The above ingredients were mixed together and used as the catalyst in the polymerization described immediately below.

(B) Polymerization:

| | Ml. |
|---|---|
| Isoprene | 150 |
| Petroleum ether | 450 |
| Catalyst mixture (prepared as just described) | 5 |

The above ingredients were sealed into a 32-ounce beverage bottle which contained a magnetic stirring bar and which had previously been flushed with helium. The bottle was placed in a bath at 55° C. on a magnetic stirrer for 48 hours. The bottle was then cut open and the polymer recovered as in the preceding examples. Infra-red analysis indicated that the polymer contained 93.1% cis-1,4-; 2.9% trans-1,4-; 0.0% 1,2-; and 4.0% 3,4-unsaturation, the total unsaturation found being 100.1%.

*Example XIII*

(A) Preparation of catalyst:

| | |
|---|---|
| Aluminum trichloride _____grams__ | 5 |
| Titanium tetrachloride _____do____ | 7.1 |
| Lithium dispersion (35%) dispersion in petrolatum) _____do____ | 12.0 |
| n-Heptane | |
| First portion _____ml__ | 100 |
| Second portion _____ml__ | 50 |

A flask provided with a stirrer and with a connection for flushing the free space with helium, and with an ice bath for cooling, was employed in this preparation. The aluminum trichloride, titanium tetrachloride and the first portion of the heptane were charged first. The aluminum trichloride turned yellow during the charging, indicating that it contained traces of water. The lithium suspension, diluted with the second portion of the heptane, was added next. Considerable heat was evolved during the addition. The mixture was stirred for an additional hour after the addition of the lithium dispersion. The product was then pressured over into a storage bottle which had previously been flushed with helium.

(B) Polymerization:

| | |
|---|---|
| Isoprene _____grams__ | 75 |
| Petroleum ether _____do____ | 225 |
| Catalyst (prepared as just described) ____ml__ | 0.5 |

The above ingredients were sealed into a 32-ounce beverage bottle which had previously been flushed with helium and which contained a magnetic stirring bar. The bottle was placed in a bath at 55° C. and magnetic agitation applied for 16 hours, at the end of which time polymerization began to set in. The bottle was then removed and let stand for 5 days. The bottle was then cut open, and the polymer recovered as in the preceding examples. The product was a tough rubbery polyisoprene.

*Example XIV*

| | |
|---|---|
| Diethyl ether _____ml__ | 75 |
| Aluminum trichloride (anhydrous) _____grams__ | 5 |
| Lithium dispersion (34.5% dispersion in petrolatum) _____do____ | 4.26 |

Using diethyl ether as in the reaction medium, it is believed that the reaction between lithium and aluminum trichloride proceeds as follows:

$$3Li + 2AlCl_3 \rightarrow LiAlCl_4 + 2LiCl + Al$$

On this assumption, the above schedule provides 4.75 moles excess lithium for each mole of the complex formed.

A flask provided with a heating jacket, dropping funnel, agitator, a connection for flushing with nitrogen, a distillation column, offtake condensor, vacuum connection and receiver was provided for this preparation. The lithium dispersion and diethyl ether were charged first, and agitation commenced and continued throughout the process to follow. The aluminum trichloride was next slowly added over the course of 30 minutes, keeping the temperature of the reaction at about 25° C. The reaction was continued for an additional two and one-half hours, at the end of which time the diethyl ether was displaced by slowly adding n-heptane and distilling under vacuum with a pot temperature of 45° C. The total volume of distillate was about 500 ml., and the residue in the pot was adjusted to a concentration of $7 \times 10^{-3}$ grams of free lithium per ml.

(B) Polymerization:

| | Ml. |
|---|---|
| Isoprene | 75 |
| Petroleum ether | 225 |
| Catalyst (prepared as just described) | 2 |

The above ingredients were sealed into a 32-ounce beverage bottle provided with a magnetic stirring bar and previously flushed with helium. The bottle was placed in a bath at 55° C. on a magnetic stirrer, the temperature of the bath being decreased to 30° C. over a period of 3 hours. The polymerization was continued at 30° C. for two days, at the end of which time a tough, rubbery polymer was recovered as described in the preceding examples. The polymer contained 93.9% cis-1,4-; 0.0% trans-1,4-; 0.0% 1,2-; and 6.1% 3,4-unsaturation, the total unsaturation found being 91.6%.

*Example XV*

(A) Preparation of catalyst:

| | |
|---|---|
| Ferric chloride _____grams__ | 2.3003 |
| Lithium paste (35% in petrolatum) _do____ | 2.09 |
| n-Heptane _____ml__ | 200 |

The above ingredients were charged into a flash provided with a stirrer and a connection for flushing the free space with helium. The mixture was agitated and heated to 80° C. for 1 hour, then cooled and pressured into a storage bottle. The product was a block suspension. The receipe provides a stoichiometric excess of 5.94 moles of free lithium per mole of assumed complex formed.

(B) Polymerization:

| | Ml. |
|---|---|
| Isoprene | 60 |
| Petroleum ether | 150 |
| Catalyst (prepared as just described) | 4.0 |

The above ingredients were polymerized in a beverage bottle with magnetic agitation, and the polyisoprene recovered as described in the previous examples. The polyisoprene contained 0.0% gel, and had an intrinsic viscosity of 4.81. Infra-red analysis indicated the presence of 92.5% cis-1,4-; 0.0% trans-1,4-; 0.0% 1,2-; and 7.5% 3,4-unsaturation, the total unsaturation found being 88.0%.

*Example XVI*

| | |
|---|---|
| Petroleum ether _____ml__ | 250 |
| Lithium paste (35% dispersion in petrolatum) _g__ | .1213 |
| Isoprene _____ml__ | 100 |
| Triethyl aluminum solution (1 molar, in petroleum ether) _____ml__ | 8 |
| Titanium tetrachloride (1 molar, in petroleum ether) _____ml__ | 5 |

The above ingredients were sealed into a bottle containing a magnetic stirring bar and purged with helium. It is assumed that the lithium and triethyl aluminum react to form lithium aluminum tetraethyl, and that the latter complexes with titanium tetrachloride. The bottle was placed in a brine bath at —20° C. on a magnetic stirrer, these conditions being maintained for 18 hours. The bottle was then cut open, and the polymer recovered by precipitation with isopropanol and washed on a wash mill. The product was a tough, rubbery polyisoprene.

*Example XVII*

(A) Preparation of catalyst:

| | |
|---|---|
| Diethyl ether ml | 500 |
| Lithium paste (35% dispersion in petrolatum) grams | 20 |
| alpha-Naphthyl bromide do | 103 |

A flask provided with a stirrer, a dropping funnel, and a connection for flushing with argon was used in this preparation. The apparatus was preliminarily purged with argon, flame-dried, and diethyl ether and lithium paste charged, and agitation commenced. The alpha-naphthyl bromide was added slowly through the dropping funnel over a period of 1 hour at temperatures rising from 22° C. to 30° C. Stirring was continued for a further two and one-half hours, at the end of which time the reaction mass was pressured over into a still, in which the diethyl ether was distilled off and replaced with n-heptane, a total of 900 ml. of n-heptane being distilled through the apparatus as a chasing operation, the total volume of the suspension in the petroleum ether left in the distillation flask being about 500 ml. The suspension was then pressured over into a storage bottle, followed by a wash of further n-heptane to pick up the clingage in the apparatus. The total volume of the material in the storage bottle was 590 ml. Based on the amount of original charge, this is equivalent to 0.0119 grams of lithium per ml. of suspension, or about a 1 molar concentration of alpha-naphthyl lithium.

(B) Polymerization:

| | Ml. |
|---|---|
| Isoprene | 100 |
| Petroleum ether | 300 |
| alpha-Naphthyl lithium suspension, prepared as just described) | 20 |
| Titanium tetrachloride solution (1.0 molar) | 6.8 |

The above ingredients were charged into a 32-ounce beverage bottle which had previously been flushed with helium. The bottle was placed on a polymerizer wheel in a bath at 50° C. At the end of 24 hours, the bottle was removed and the polymer recovered as in the previous examples. The product was a rubbery polyisoprene.

*Example XVIII.—Lithium Naphthalenide-Titanium Tetrachloride Reaction Product Catalyst*

(A) Preparation of lithium naphthalenide:

| | |
|---|---|
| Naphthalene grams | 25 |
| Lithium dispersion (34.5% dispersion in petrolatum) grams | 3.95 |
| Diethyl ether ml | 150 |

A flask provided with an agitator, dropping funnel, inert gas inlet, heating mantle and distillation head was used in this preparation. The flask was purged with inert gas and the above ingredients charged. The mass was agitated for 20 hours, at the end of which time the flask was heated to distill off the ether, which was continuously replaced by n-heptane introduced through the dropping funnel. Distillation and agitation were continued, after the boiling temperature became constant, until a further 300 ml. of n-heptane had distilled over, insuring complete removal of the diethyl ether. The resultant suspension of lithium naphthalenide was transferred to a storage bottle. The lithium content was determined by titration with HCl and found to be 0.67 molar.

(B) Preparation of catalyst and reaction medium:

| | Ml. |
|---|---|
| Lithium naphthalenide suspension (0.67 molar, prepared as just described) | 5.0 |
| Titanium tetrachloride solution (1 molar solution in petroleum ether) | 1.0 |
| Petroleum ether | 225 |

The above recipe provides a ratio of Li:TiCl$_4$ of 3.35:1. The above ingredients were agitated together in a bottle provided with a magnetic stirrer for 63 hours at 50° C. The product was used as a catalyst and reaction medium as described below.

(C) Polymerization:

| | |
|---|---|
| Isoprene ml | 75 |
| Catalyst and reaction medium (prepared as just described) | entire product. |
| Lithium naphthalenide suspension (0.67 molar, prepared as above described) ml | 0.5 |

The isoprene and additional lithium naphthalenide were added to the catalyst-reaction medium prepared as just described, and stirring continued at 50° C. for an additional 18 hours. At the end of this time the bottle was vented and cut open to remove the polymer solution, and the polymer recovered as described in Example VI. The yield was 50%, based on isoprene. The polymer formed a crystalline complex with silver nitrate, contained no gel, and had an intrinsic viscosity of 7.80.

*Example XIX*

(A) Preparation of catalyst and reaction medium:

| | Ml. |
|---|---|
| Petroleum ether | 450 |
| Lithium naphthalenide suspension (prepared as described in Example XVIII-A) | 9 |
| Titanium tetrachloride-aluminum chloride solution (in petroleum ether, 1 molar in titanium tetrachloride, 0.1 molar in aluminum chloride) | 2 |

The above ingredients provided a ratio of Li:TiCl$_4$ of 3.0:1. The ingredients were agitated together in a bottle provided with a magnetic stirrer for 60 hours at 50° C. The product was used as a catalyst and reaction medium as described below.

(B) Polymerization:

| | |
|---|---|
| Isoprene ml | 150 |
| Lithium naphthalenide suspension (prepared as described in Example XVIII-A) ml | 1.0 |
| Catalyst and reaction medium (prepared as just described) | entire product |

The isoprene and additional lithium naphthalenide were added to the catalyst-reaction medium prepared as just decribed, and the mixture stirred for an additional 24 hours at 50° C. The bottle was cut open and the polymer recovered as in Example VI. The yield of polymer was 25%. The polymer formed a crystalline complex with silver nitrate.

*Example XX*

| | Ml. |
|---|---|
| Isoprene | 75 |
| Lithium naphthalenide suspension (prepared as described in Example XVIII-A) | 0.5 |
| Lithium-aluminum chloride complex suspension (prepared as described in Example IV-A, stoichiometric excess=7.1) | 10 |
| Petroleum ether | 225 |

The polymerization was conducted in a 32-ounce beverage bottle provided with a magnetic stirring bar. An excess of isoprene was charged first and allowed to evaporate down to 75 ml. to purge the free space in the bottle. The remaining ingredients were then charged, and the bottle was sealed and placed in a water bath maintained at 50° C. provided with a magnetic stirrer. At the end of 18 hours, the bottle was vented and cut open, and the polymer recovered as described in Example VI. There was obtained a 30% yield of a polyisoprene which formed a crystalline complex with silver nitrate.

Example XXI

| | Ml. |
|---|---|
| Petroleum ether | 450 |
| Lithium-aluminum trichloride complex suspension (prepared as described in Example IV-A, stoichiometric excess=7.1) | 5 |
| Lithium naphthalenide suspension (prepared as described in Example XVIII-A) | |
| First portion | 1 |
| Second portion | 1 |

The petroleum ether, lithium-aluminum chloride complex, and first portion of lithium naphthalenide were charged into a beverage bottle provided with a magnetic stirring bar. The bottle was closed and magnetically agitated at 50° C. for 1 hour. The bottle was opened, the isoprene and second portion of lithium naphthalenide added, and the bottle resealed. Agitation at 50° C. was resumed for an additional 18 hours. The polymer was recovered as in the preceding example. There was obtained a 90% yield of a polyisoprene which formed a crystalline complex with silver nitrate, contained 0.0% gel and had an intrinsic viscosity of 10.3.

Infra-red analysis indicated the presence of 92.2% cis-1,4-; 1.8% trans-1,4-; 0.0% 1,2- and 6.0% 3,4-unsaturation, the total unsaturation found being 95.6%.

Example XXII

| | | Milliliter |
|---|---|---|
| A | Petroleum ether | 450 |
| | Lithium-aluminum trichloride complex suspension (stoichiometric excess 3.0; contains .0017 mol of free Li per ml.) | 3.0 |
| | Lithium naphthalenide suspension (prepared as described in Example XVIII-A) | 3.0 |
| B | Isoprene | 150 |
| | Lithium naphthalenide suspension (prepared as described in Example XVIII-A) | 1.0 |

The ingredients A were sealed into a bottle and stirred with a magnetic bar for 15 hours at 50° C., then cooled to 25° C. The bottle was then opened, the ingredients B charged, the bottle re-sealed, and stirring continued for a further 18 hours at 25° C. There was obtained a 90% yield of a polyisoprene which formed a crystalline complex with silver nitrate.

Example XXIII (A) Preparation of lithium naphthalenide:

| | |
|---|---|
| Naphthalene | grams 50 |
| Lithium dispersion (34.5% dispersion in petrolatum) | grams 8 |
| Diethl ether | ml 250 |

The above ingredients were reacted together as described in Example XVIII-A above. The diethyl ether was displaced by distillation with n-heptane, 500 ml. of n-heptane being distilled over as a chasing operation after the boiling point reached 98° C. Fifty milliliters of mineral oil were added to stabilize the suspension, and the entire mass diluted to 750 ml. with n-heptane. Titration with HCl indicated that the dispersion was 0.655 molar in lithium naphthalenide.

(B) Polymerization:

| | Ml. |
|---|---|
| Petroleum ether | 450 |
| Lithium-aluminum chloride complex suspension (prepared as described in Example IV-A) | 5 |
| Lithium naphthalenide suspension (prepared as described above) | 2.5 |
| Isoprene | 150 |

All ingredients except the isoprene were sealed into a bottle and stirred with a magnetic bar for 2 hours at 25° C. The isoprene was then added, and the stirring continued at 25° C. for a further 24 hours. The polymer was recovered as in Example VI. The yield was 65%, and the polymer formed a crystalline complex with silver nitrate.

Example XXIV (A) Preparation of catalyst:

| | | |
|---|---|---|
| X | Aluminum chloride, grams | 26.7 |
| | Lithium dispersion (34.5% dispersion in petrolatum), grams | 14.07 |
| | n-Heptane, ml | 400 |
| Y | Dispersion of ingredients listed at X, ml | 200 |
| | Lithium naphthalenide suspension (prepared as described in Example XXIII-A above), ml | 17.5 |
| | n-Heptane, ml | 82.5 |

The ingredients listed at X were sealed into a beverage bottle which was previously flushed with helium and provided with ball-milling pebbles. The bottle was then revolved for 18 hours at 25° C. to ball-mill the contents. The resultant dispersion was used in the recipe indicated at Y. The ingredients Y were sealed into a beverage bottle previously flushed with helium and provided with milling pebbles, and the bottle rotated to ball-mill the contents for a further 18 hours. The resultant suspension was used as the catalyst in the polymerization recipe below.

(B) Polymerization:

| | Ml. |
|---|---|
| Petroleum ether | 450 |
| Isoprene | 150 |
| Catalyst suspension (prepared as just described) | 10 |

The above ingredients were sealed into a polymerization bottle provided with a magnetic stirring bar. Excess isoprene was charged first and evaporated down to the indicated volume in order to purge the bottle. The bottle was placed in a water bath maintained at 40° C. and provided with a magnetic stirrer. At the end of 18 hours, polymerization had set in, and the bath temperature was reduced to 25° C. At the end of four days total reaction time, the bottle was removed and the polymer recovered as in the preceding examples. There was obtained a 25% yield of a polyisoprene which formed an extremely crystalline complex with silver nitrate.

From the foregoing general discussion and detailed specific examples, it will be evident that this invention provides a novel method for the polymerization of conjugated diolefines to yield products having chemical and physical properties closely approaching those of Hevea rubber. The process is readily carried out in simple equipment and with relatively inexpensive starting materials. The polymerized products may be used for any of the purposes for which natural Hevea rubber is customarily used, particularly in heavy duty truck tires, air springs, torsion bushings, tubing, and the like.

What is claimed is:

1. Process of polymerizing isoprene, which comprises contacting, at temperatures in the range of 0° C. to 150° C. the isoprene, in the absence of ethers, esters and amines, with a composite catalyst comprising (A) metallic lithium plus (B) a reaction product of a substance selected from the group consisting of metallic lithium, lithium hydrocarbons and adducts of lithium with polynuclear aromatic hydrocarbons with compounds of the formula $(M_H)_{o'}X_pA_q$ wherein $M_H$ is a metal selected from the group consisting of aluminum, boron, silicon, arsenic, zinc, palladium, uranium, titanium, molybdenum, iron, platinum, mercury, vanadium, manganese, chromium, cobalt, nickel and lanthanum, X is an electro-negative radical selected from the group consisting of chlorine, iodine, bromine, fluorine, oxygen, hydrocarbon and hydroxyl and covalently linked to $M_H$, A is a neutral radical selected from the group consisting of hydrate and carbonyl and covalently linked to $M_H$ and $o'$, $p$ and $q$ are integers, with the proviso that $q$ may be zero.

2. Process of polymerizing isoprene, which comprises contacting at temperatures in the range of 0° C. to 150°

C. the isoprene, in the absence of ethers, esters and amines, with a composite catalyst comprising (A) metallic lithium plus (B) a compound of the formula $$Li_n(Al_oX_pA_q)_r$$

wherein X is a negative radical selected from the group consisting of chlorine, iodine, bromine, fluorine, oxygen, hydrocarbon and hydroxyl, A is a neutral radical selected from the group consisting of hydrate and carbonyl and $o$, $p$ and $q$ are integers such that $pV_x+qV_a=6o$, where $V_x$ is the valence of the radical X, $V_a$ is the valence of the radical A and $n$ and $r$ are integers such that $n=r(pE_x-3o)$ wherein $E_x$=the negative electrovalence of the radical X.

3. Process of polymerizing isoprene, which comprises contacting at temperatures in the range of 0° C. to 150° C. the isoprene, in the absence of ethers, esters and amines with a composite catalyst comprising (A) metallic lithium and (B) a complex salt produced by reacting (1) metallic lithium with (2) aluminum chloride containing 0.1 to 1.0 moles of water per mole of aluminum chloride.

4. Process of polymerizing isoprene which comprises contacting at temperatures in the range of 0° C. to 150° C. isoprene in the absence of ethers, esters and amines, with a composite catalyst comprising (A) an addition compound of lithium with a polynuclear aromatic hydrocarbon and (B) a complex salt produced by reacting an addition compound of lithium with a polynuclear aromatic hydrocarbon with aluminum chloride.

5. A novel catalytic composition of matter comprising (A) free lithium metal, plus (B) the reaction product of lithium metal with a hydrated aluminum halide.

6. A novel catalytic composition of matter comprising the reaction product of a hydrocarbon lithium with a hydrated aluminum halide.

7. A novel catalytic composition of matter comprising the reaction product of (A) a lithium adduct of a polynuclear aromatic hydrocarbon with (B) an aluminum halide.

8. A novel catalytic composition of matter comprising the reaction product of (A) a lithium adduct of a polynuclear aromatic hydrocarbon with (b) aluminum chloride.

9. A novel catalytic composition of matter comprising the reaction product of (A) a lithium adduct of a polynuclear aromatic hydrocarbon with (B) a hydrated aluminum halide.

References Cited
UNITED STATES PATENTS

| | | | |
|---|---|---|---|
| 2,905,645 | 9/1959 | Anderson et al. | 260—94.9 |
| 2,984,658 | 5/1961 | Seydel et al. | 260—94.9 |
| 2,989,487 | 6/1961 | Truett | 260—94.9 |
| 3,058,963 | 10/1962 | Vandenberg | 260—94.9 |
| 3,122,527 | 2/1964 | Webb et al. | 260—94.9 |

JOSEPH L. SCHOFER, *Primary Examiner.*

H. I. CANTOR, *Assistant Examiner.*

UNITED STATES PATENT OFFICE
CERTIFICATE OF CORRECTION

Patent No. 3,329,666            July 4, 1967

Richard S. Stearns

It is certified that error appears in the above identified patent and that said Letters Patent are hereby corrected as shown below:

Column 2, line 1, the indistinct word should read -- eral --. Column 6, line 33, "linke dthereto" should read -- linked thereto --. Column 7, line 73, "LiAlcl$_6$" should read -- Li$_3$AlCl$_6$ --. Column 13, TABLE I, third column, line 1 thereof, "32" should read -- 325 --; same table, third column, line 2 thereof, "80" should read -- 800 --. Column 16, line 58, "1.32" should read -- 1.932 --. Column 17, line 65, "colar" should read -- molar --. Column 21, line 44, "prepared" should read -- (prepared --.

Signed and sealed this 10th day of March 1970.

(SEAL)

Attest:

Edward M. Fletcher, Jr.

Attesting Officer

WILLIAM E. SCHUYLER, JR.

Commissioner of Patents